US011932803B2

(12) United States Patent
    May

(10) Patent No.: US 11,932,803 B2
(45) Date of Patent: Mar. 19, 2024

(54) METHODS AND COMPOSITIONS FOR ENHANCING CLAY VISCOSIFIERS

(71) Applicant: Halliburton Energy Services, Inc., Houston, TX (US)

(72) Inventor: Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/052,447

(22) PCT Filed: Jun. 5, 2018

(86) PCT No.: PCT/US2018/036024
§ 371 (c)(1),
(2) Date: Nov. 2, 2020

(87) PCT Pub. No.: WO2019/236063
PCT Pub. Date: Dec. 12, 2019

(65) Prior Publication Data
US 2021/0087455 A1    Mar. 25, 2021

(51) Int. Cl.
    *C09K 8/14*    (2006.01)
    *C09K 8/24*    (2006.01)
    *E21B 21/00*    (2006.01)
(52) U.S. Cl.
    CPC ............... *C09K 8/24* (2013.01); *C09K 8/145* (2013.01); *E21B 21/00* (2013.01)
(58) Field of Classification Search
    CPC . C09K 8/24; C09K 8/22; C09K 8/145; C09K 8/05; C09K 8/14; E21B 21/003; E21B 21/00
    See application file for complete search history.

(56) References Cited

U.S. PATENT DOCUMENTS 2,702,788 A  *  2/1955  Dawson ................. C09K 8/145
                                                    507/119
2,775,557 A  *  12/1956  Morgan .................... C09K 8/24
                                                    507/120

(Continued)

FOREIGN PATENT DOCUMENTS

EP    0207810 A2  *  1/1987  ............. C01B 33/44
EP    0545677 A1  *  6/1993  ............... C09K 8/24

(Continued)

OTHER PUBLICATIONS

Seawater FAQs, Texas Water Development Board, retrieved Jul. 9, 2022 from https://www.twdb.texas.gov/innovativewater/desal/faqseawater.asp#:~:text=Brackish%20water%20typically%20contains%20TDS,%3E35%2C000%20mg%2Fl)., no date (Year: NA).*
International Preliminary Report on Patentability issued in related PCT Application No. PCT/US2018/036024 dated Dec. 17, 2020, 8 pages.
International Search Report and Written Opinion issued in related PCT Application No. PCT/US2018/036024 dated Apr. 29, 2019, 11 pages.

*Primary Examiner* — Angela M DiTrani Leff
(74) *Attorney, Agent, or Firm* — Thomas Rooney; C. Tumey Law Group PLLC

(57) ABSTRACT

Methods and compositions for improving the rheological properties of fluids including sepiolite are provided. In one or more embodiments, the compositions comprise a clay selected from the group consisting of: sepiolite, palygorskite, attapulgite, and a combination thereof; and an extender comprising sodium polyacrylate, wherein the extender is present in an amount from about 0.01 lbs/ton of the clay to about 10 lbs/ton of the clay. In one or more embodiments, the methods comprise introducing a treatment fluid into a wellbore penetrating at least a portion of a subterranean formation, wherein the treatment fluid comprises an aqueous base fluid, a clay selected from the group consisting of: sepiolite, palygorskite, attapulgite, and a combination thereof, and an extender comprising sodium polyacrylate.

12 Claims, 3 Drawing Sheets

(56) References Cited

U.S. PATENT DOCUMENTS

| | | | |
|---|---|---|---|
| 4,201,679 A * | 5/1980 | Barker | C09K 8/24 |
| | | | 507/120 |
| 4,318,732 A | 3/1982 | Sawyer, Jr. | |
| 4,391,925 A * | 7/1983 | Mintz | C09K 8/502 |
| | | | 166/270.2 |
| 4,944,918 A * | 7/1990 | Desai | A61L 2/0035 |
| | | | 422/22 |
| 4,964,918 A * | 10/1990 | Brown | C09K 8/56 |
| | | | 106/803 |
| 5,975,220 A * | 11/1999 | Mueller | C09K 8/08 |
| | | | 175/65 |
| 6,130,179 A * | 10/2000 | Sampson | C01B 33/26 |
| | | | 501/148 |
| 2005/0187113 A1 * | 8/2005 | Hayes | C09K 8/03 |
| | | | 507/119 |
| 2005/0239663 A1 * | 10/2005 | West | C09K 8/12 |
| | | | 507/120 |
| 2014/0066340 A1 | 3/2014 | Hoff | |

FOREIGN PATENT DOCUMENTS

| | | | | |
|---|---|---|---|---|
| EP | 3246299 A1 | 11/2017 | | |
| WO | WO-8100850 A1 * | 4/1981 | | C09K 8/26 |
| WO | WO-2013085767 A1 * | 6/2013 | | C09K 8/62 |
| WO | 2015/016878 A1 | 2/2015 | | |

* cited by examiner

METHODS AND COMPOSITIONS FOR ENHANCING CLAY VISCOSIFIERS

CROSS-REFERENCE TO RELATED APPLICATION

The present application is a U.S. National Stage Application of International Application No. PCT/US2018/036024 filed Jun. 5, 2018, which is incorporated herein by reference in its entirety for all purposes.

BACKGROUND

The present disclosure relates to methods and compositions for treating subterranean formations.

While drilling an oil or gas well, a drilling fluid (or drilling mud) is typically pumped down to a drill bit during drilling operations and flowed back to the surface through an annulus defined between a drill string and the walls of the wellbore. Drilling fluids often include viscosifiers to, for example, improve the ability of the drilling fluid to remove cuttings from the wellbore and suspend cuttings and weight materials in the drilling fluid during periods of noncirculation. Clays and minerals, such as bentonite, barite, and sepiolite, and natural or synthetic polymers are examples of materials that have been used as viscosifiers for such drilling fluids.

However, the presence of excessive amounts of solids in drilling fluids may have certain undesirable effects, including the formation of excessively thick filter cakes and increasing the density of the fluids. High concentrations of viscosifiers in the drilling fluids also may increase costs and decrease the capacity of the drilling fluid to remove cuttings.

BRIEF DESCRIPTION OF THE DRAWINGS

These drawings illustrate certain aspects of some of the embodiments of the present disclosure and should not be used to limit or define the claims.

Figure 1:
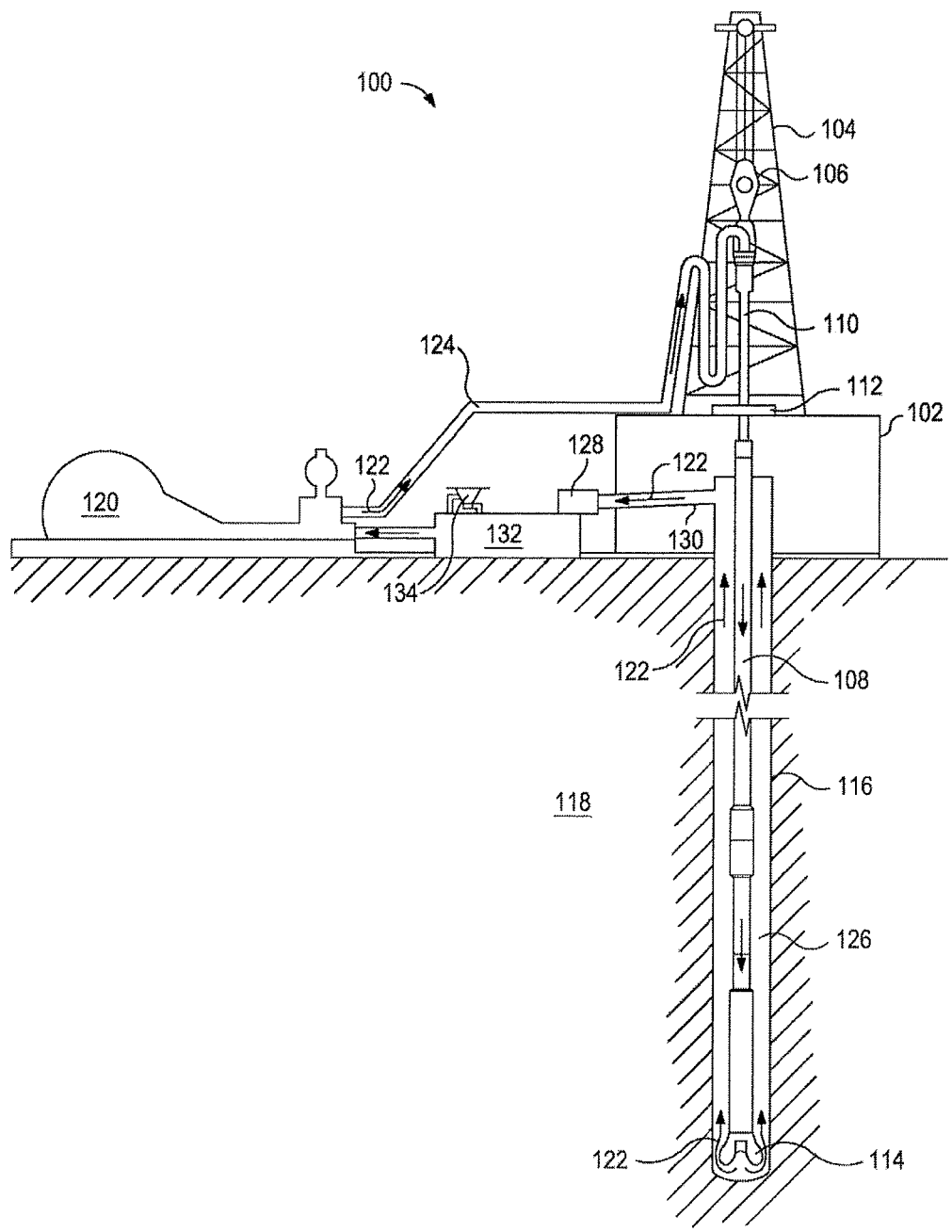
FIG. 1 is a diagram illustrating an example of a drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for treating subterranean formations. More particularly, the present disclosure relates to methods and compositions for improving the rheological properties of fluids including sepiolite.

The present disclosure provides methods and compositions for enhancing the viscosity of fluids including sepiolite by also including in the fluids an extender that includes sodium polyacrylate. The compositions of the present disclosure may generally include a clay including sepiolite, an extender including sodium polyacrylate, and, optionally, an aqueous base fluid. The methods of the present disclosure generally include: introducing a treatment fluid including an aqueous base fluid, a clay including sepiolite, palygorskite and/or attapulgite, and an extender including sodium polyacrylate into a wellbore penetrating at least a portion of a subterranean formation. In some embodiments, the methods of the present disclosure may also include drilling at least a portion of the wellbore penetrating the subterranean formation with the treatment fluid.

Among the many potential advantages to the methods and compositions of the present disclosure, only some of which are alluded to herein, the methods and compositions of the present disclosure may improve the barrel yield of fluids including sepiolite using an extender such that the fluids with sepiolite may have a higher viscosity with the extender than fluids having the same amount of sepiolite without the extender. Without being limited to any particular theory, it is believed that the negatively charged portions of the extender interact with the positively charged portions of the clay thereby facilitating the flocculation of the clay in a treatment fluid. In some embodiments, a desired viscosity of a fluid may be achieved using an extender and less sepiolite than would otherwise be used without the extender to achieve the same viscosity. In certain embodiments, the use of the extender with sepiolite may reduce the amount of solids in a fluid, which in turn may prevent or at least partially reduce the formation of excessively thick filter cakes and also may prevent the desired density of the fluid from being exceeded.

In one or more embodiments, the enhanced sepiolite compositions of the present disclosure may include a clay and an extender. In one or more embodiments, the clay includes sepiolite, palygorskite, attapulgite, or a combination thereof. In some embodiments, the clay may be a mixture of clays. In such embodiments, the extender may be one or more of sepiolite, palygorskite, attapulgite, and/or bentonite. In one or more embodiments, the clay may be free, or substantially free, of bentonite. In one or more embodiments, the clay consists of sepiolite.

In one or more embodiments, the extender includes sodium polyacrylate. In some embodiments, the extender may be a mixture of extenders. In such embodiments, the extender may include sodium polyacrylate and an additional extender component that includes polyacrylamide (including hydrolyzed polyacrylamide), magnesium oxide, calcium oxide, calcium magnesium oxide, potassium polyacrylate, polyacrylic acid, soda ash, or a combination thereof. In some embodiments, the extender or enhanced sepiolite composition may be substantially free of other extenders such as polyacrylamide (including hydrolyzed polyacrylamide), magnesium oxide, calcium oxide, and/or calcium magnesium oxide. In one or more embodiments, the sodium polyacrylate may have a molecular weight in a range from about 50,000 g/mol to about 10,000,000 g/mol. In one or more embodiments, the sodium polyacrylate may have a molecular weight in a range from about 200,000 g/mol to about 700,000 g/mol. In one or more embodiments, the sodium polyacrylate may have a molecular weight in a range from about 300,000 g/mol to about 600,000 g/mol.

In one or more embodiments, the extender may be present in the enhanced sepiolite compositions of the present disclosure in an amount within a range from about 0.01 lbs of extender/ton of clay to about 10 lbs of extender/ton of clay. In one or more embodiments, the extender may be present in an amount within a range from about 1 lb of extender/ton of clay to about 8 lbs of extender/ton of clay. In one or more embodiments, the extender may be present in an amount within a range from about 1 lb of extender/ton of clay to about 6 lbs of extender/ton of clay. In one or more embodiments, the extender may be present in an amount within a range from about 1 lb of extender/ton of clay to about 4 lbs of extender/ton of clay.

In one or more embodiments, the enhanced sepiolite compositions disclosed herein and/or components thereof may be included in treatment fluids to be used in subterranean formations. Such treatment fluids may include, but are not limited to, drilling fluids, fracturing fluids, completion fluids, gravel pack fluids, geothermal grouts, slurry walls, and plugging and abandonment fluids. As used herein, the terms "treat," "treatment" and "treating" refer to any subterranean operation that uses a fluid in conjunction with achieving a desired function and/or for a desired purpose. The use of these terms does not imply any particular action by the treatment fluid. Although the use of the enhanced sepiolite compositions in treatment fluids is discussed herein, a person skilled in the art, with the benefit of this disclosure, will recognize other possible uses for the enhanced sepiolite compositions, such as in animal litter, pelletizing of iron ore, clay soil amendment, geosynthetic clay liner, foundry molds, an asphalt emulsion slurry, and an environmental containment (capping) slurry.

In certain embodiments, the treatment fluids used in the methods of the present disclosure may include an aqueous base fluid. The term "base fluid" refers to the major component of the fluid (as opposed to components dissolved and/or suspended therein) and does not indicate any particular condition or property of that fluids such as its mass, amount, pH, etc. Aqueous base fluids that may be suitable for use in the methods of the present disclosure may include water from any source and may include any components other than water that do not adversely impact the alkali solution, silicate component, and/or aluminum components used in the particular application of the present disclosure. Such aqueous base fluids may include fresh water, salt water (e.g., water containing one or more salts dissolved therein), brine (e.g., saturated salt water), seawater, or any combination thereof.

In some embodiments, the aqueous base fluids may include one or more ionic species, such as those formed by salts dissolved in water. For example, seawater and/or produced water may include a variety of divalent cationic species dissolved therein. The ionic species may be any suitable ionic species known in the art. In certain embodiments, the ionic species may be one or more salts selected from the group consisting of: sodium chloride, sodium bromide, sodium acetate, sodium formate, sodium citrate, potassium chloride, potassium formate, calcium chloride, calcium nitrate, calcium bromide, magnesium chloride, magnesium bromide, magnesium sulfate, cesium formate, and any combination thereof. In one or more embodiments, the salt may be present in the aqueous base fluid in an amount within a range from about 50 mg/L of aqueous base fluid to about 500,000 mg/L of aqueous base fluid. In one or more embodiments, the salt may be present in the aqueous base fluid in an amount within a range from about 200 mg/L of aqueous base fluid to about 100,000 mg/L of aqueous base fluid.

In certain embodiments, the density of the aqueous base fluid can be adjusted to, among other purposes, provide additional particulate transport and suspension. In certain embodiments, the pH of the aqueous base fluid may be adjusted (e.g., by a buffer or other pH adjusting agent) to a specific level, which may depend on, among other factors, the types of clays, acids, and other additives included in the fluid. One of ordinary skill in the art with the benefit of this disclosure will recognize when such density and/or pH adjustments are appropriate.

In one or more embodiments, the enhanced sepiolite compositions of the present disclosure may be present in the treatment fluids in an amount within a range from about 2 lbs/bbl of treatment fluid to about 20 lbs/bbl of treatment fluid. In one or more embodiments, the enhanced sepiolite compositions may be present in the treatment fluids in an amount within a range from about 2 lbs/bbl of treatment fluid to about 15 lbs/bbl of treatment fluid. In one or more embodiments, the enhanced sepiolite compositions may be present in the treatment fluids in an amount within a range from about 2 lbs/bbl of treatment fluid to about 10 lbs/bbl of treatment fluid. In one or more embodiments, the enhanced sepiolite compositions may be present in the treatment fluids in an amount within a range from about 4 lbs/bbl of treatment fluid to about 10 lbs/bbl of treatment fluid. These amounts of the enhanced sepiolite compositions provided include both the clay and the extender combined in an amount within the ranges described above. However, each component of the enhanced sepiolite compositions (i.e., the clay and the extender) also may be introduced into the treatment fluids separately, as discussed below.

In certain embodiments, treatment fluids used in the methods of the present disclosure optionally may include any number of additives. Examples of such additives include, but are not limited to, additional salts, surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, additional viscosifying/gelling agents, breakers, weighting agents, relative permeability modifiers, resins, wetting agents, coating enhancement agents, filter cake removal agents, antifreeze agents (e.g., ethylene glycol), proppant particles, and the like. A person skilled in the art, with the benefit of this disclosure, will recognize the types of additives that may be included in the treatment fluids of the present disclosure for a particular application.

The enhanced sepiolite compositions and treatment fluids of the present disclosure may be prepared using any suitable method and/or equipment known in the art at any time prior to their use. In one or more embodiments, the clay including sepiolite may be a dry solid (e.g., a powder) or a liquid (e.g., in a mineral suspension). In one or more embodiments, the extender may be a dry solid (e.g., a powder) or a liquid. In one or more embodiments, the clay including sepiolite may be blended with the extender to form the enhanced sepiolite compositions. In such embodiments, the blended combination of the clay including sepiolite and the extender may be added to an aqueous base fluid to form a treatment fluid. In one or more embodiments, the clay including sepiolite and the extender may each be added separately to an aqueous base fluid to form a treatment fluid.

In one or more embodiments, the clay including sepiolite and the extender, either combined or separately, may be added to the aqueous base fluid along with any other additives at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

Some embodiments of the present disclosure provide methods for using the disclosed compositions and treatment fluids to carry out a variety of subterranean treatments, including but not limited to, drilling. The drilling fluids disclosed herein may directly or indirectly affect one or more components or pieces of equipment associated with the preparation, delivery, recapture, recycling, reuse, and/or disposal of the drilling fluids. For example, and with reference to FIG. 1, the drilling fluids disclosed herein may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling fluid 122 prepared with the compositions disclosed herein through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more components of the enhanced sepiolite compositions disclosed herein may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the components of the enhanced sepiolite compositions may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the enhanced sepiolite compositions or components thereof may be stored, reconditioned, and/or regulated until added to the drilling fluid 122.

As mentioned above, the drilling fluid 122 prepared with a composition disclosed herein may directly or indirectly affect the components and equipment of the drilling assembly 100. For example, the disclosed drilling fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the drilling fluid 122.

The drilling fluid 122 prepared as disclosed herein may directly or indirectly affect the pump 120, which representatively includes any conduits, pipelines, trucks, tubulars, and/or pipes used to fluidically convey the drilling fluid 122 downhole, any pumps, compressors, or motors (e.g., topside or downhole) used to drive the drilling fluid 122 into motion, any valves or related joints used to regulate the pressure or flow rate of the drilling fluid 122, and any sensors (i.e., pressure, temperature, flow rate, etc.), gauges, and/or combinations thereof, and the like. The disclosed drilling fluid 122 may also directly or indirectly affect the mixing hopper 134 and the retention pit 132 and their assorted variations.

The drilling fluid 122 prepared as disclosed herein may also directly or indirectly affect the various downhole equipment and tools that may come into contact with the drilling fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluid 122 may also directly or indirectly affect any downhole heat exchangers, valves and corresponding actuation devices, tool seals, packers and other wellbore isolation devices or components, and the like associated with the wellbore 116. The disclosed drilling fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling fluid 122 prepared as disclosed herein may also directly or indirectly affect any transport or delivery equipment used to convey the drilling fluid 122 to the drilling assembly 100 such as, for example, any transport vessels, conduits, pipelines, trucks, tubulars, and/or pipes used to fluidically move the drilling fluid 122 from one location to another, any pumps, compressors, or motors used to drive the drilling fluid 122 into motion, any valves or related joints used to regulate the pressure or flow rate of the drilling fluid 122, and any sensors (i.e., pressure and temperature), gauges, and/or combinations thereof, and the like.

An embodiment of the present disclosure is a method including: introducing a treatment fluid into a wellbore penetrating at least a portion of a subterranean formation, wherein the treatment fluid comprises an aqueous base fluid, a clay selected from the group consisting of: sepiolite, palygorskite, attapulgite, and a combination thereof, and an extender comprising sodium polyacrylate. In one or more embodiments described in the preceding paragraph, wherein the extender is present in an amount from about 0.01 lbs/ton of the clay to about 10 lbs/ton of the clay. In one or more embodiments described above, wherein the extender further comprises an additional component selected from the group consisting of: polyacrylamide, magnesium oxide, calcium oxide, calcium magnesium oxide, potassium polyacrylate, polyacrylic acid, soda ash and any combination thereof. In one or more embodiments described above, wherein the aqueous base fluid is selected from the group consisting of: fresh water, salt water, brine, seawater, and any combination thereof. In one or more embodiments described above, wherein the aqueous base fluid comprises one or more salts in an amount of about 50 mg/L of the aqueous base fluid to about 500,000 mg/L of the aqueous base fluid. In one or more embodiments described above, wherein the aqueous base fluid comprises an amount of the clay and the extender, combined, from about 2 lbs/bbl of the treatment fluid to about 20 lbs/bbl of the treatment fluid. In one or more embodiments described above, further comprising drilling a portion of the wellbore penetrating the subterranean formation with the treatment fluid.

Another embodiment of the present disclosure is a method including: providing a drilling fluid comprising an aqueous base fluid, a clay selected from the group consisting of: sepiolite, palygorskite, attapulgite, and a combination thereof, and an extender comprising sodium polyacrylate; and drilling at least a portion of a wellbore penetrating a subterranean formation with the drilling fluid. In one or more embodiments described in the preceding paragraph, wherein the extender is present in an amount from about 0.01 lbs/ton of the clay to about 10 lbs/ton of the clay. In one or more embodiments described above, wherein the extender further comprises an additional component selected from the group consisting of: polyacrylamide, magnesium oxide, calcium oxide, calcium magnesium oxide, potassium polyacrylate, polyacrylic acid, soda ash and any combination thereof. In one or more embodiments described above, wherein the aqueous base fluid is selected from the group consisting of: fresh water, salt water, brine, seawater, and any combination thereof. In one or more embodiments described above, wherein the aqueous base fluid comprises one or more salts in an amount of about 50 mg/L of the aqueous base fluid to about 500,000 mg/L of the aqueous base fluid. In one or more embodiments described above, wherein the aqueous base fluid comprises an amount of the clay and the extender, combined, from about 2 lbs/bbl of the drilling fluid to about 20 lbs/bbl of the drilling fluid.

Another embodiment of the present disclosure is a composition including: a clay selected from the group consisting of: sepiolite, palygorskite, attapulgite, and a combination thereof; and an extender comprising sodium polyacrylate, wherein the extender is present in an amount from about 0.01 lbs/ton of the clay to about 10 lbs/ton of the clay.

In one or more embodiments described in the preceding paragraph, wherein the extender further comprises an additional component selected from the group consisting of: polyacrylamide, magnesium oxide, calcium oxide, calcium magnesium oxide, potassium polyacrylate, polyacrylic acid, soda ash and any combination thereof. In one or more embodiments described above, further comprising an aqueous base fluid. In one or more embodiments described above, wherein the aqueous base fluid comprises fresh water, salt water, brine, seawater, or any combination thereof. In one or more embodiments described above, wherein the aqueous based fluid comprises one or more salts selected from the group consisting of: sodium chloride, sodium bromide, sodium acetate, sodium formate, sodium citrate, potassium chloride, potassium formate, calcium chloride, calcium nitrate, calcium bromide, magnesium chloride, magnesium bromide, magnesium sulfate, cesium formate, and any combination thereof. In one or more embodiments described above, wherein the one or more salts is present in the aqueous base fluid in an amount of about 50 mg/L of the aqueous base fluid to about 500,000 mg/L of the aqueous base fluid. In one or more embodiments described above, wherein the aqueous base fluid comprises an amount of the clay and the extender, combined, from about 2 lbs/bbl of the composition to about 20 lbs/bbl of the composition.

EXAMPLES

To facilitate a better understanding of the present disclosure, the following examples of certain aspects of certain embodiments are given. The following examples are not the only examples that could be given according to the present disclosure and are not intended to limit the scope of the disclosure or claims.

Example 1

A treatment fluid sample (A) was prepared using only 350 mL deionized water and 10 grams of a clay consisting of sepiolite. Four additional treatment fluid samples (B-E) were prepared in accordance with certain embodiments of the present disclosure using 350 mL deionized water, 10 grams of a clay consisting of sepiolite, and an extender consisting of sodium polyacrylate having a molecular weight of about 500,000 g/mol. The viscosity of each fluid sample was measured after 10 minutes using a FANN® viscometer. The results are shown in Table 1 and FIG. 2A.

TABLE 1

| Treatment Fluid | A | B | C | D | E |
|---|---|---|---|---|---|
| Deionized Water, mL | 350 | 350 | 350 | 350 | 350 |
| Sepiolite, g | 10 | 10 | 10 | 10 | 10 |
| Polymer, lbs/ton | 0 | 2 | 4 | 6 | 8 |
| FANN 600 RPM, 1021 sec$^{-1}$ | 14 | 27.5 | 34 | 34 | 33 |
| Viscosity, cP | 7 | 13.75 | 17 | 17 | 16.5 |

A treatment fluid sample (F) was prepared using only 350 mL deionized water and 10 grams of a clay consisting of bentonite. Four additional treatment fluid samples (G-J)

were prepared using 350 mL deionized water, 10 grams of a clay consisting of bentonite, and varying amounts of an extender consisting of sodium polyacrylate having a molecular weight of about 500,000 g/mol. The viscosity of each fluid sample was measured after 10 minutes using a FANN® viscometer. The results are shown in Table 2 and FIG. 2B.

TABLE 2

| Treatment Fluid | F | G | H | I | J |
|---|---|---|---|---|---|
| Deionized Water, mL | 350 | 350 | 350 | 350 | 350 |
| Bentonite, g | 10 | 10 | 10 | 10 | 10 |
| Polymer, lbs/ton | 0 | 2 | 4 | 6 | 8 |
| FANN 600 RPM, 1021 sec$^{-1}$ | 8 | 31 | 44 | 42 | 40 |
| Viscosity, cP | 4 | 15.5 | 22 | 21 | 20 |

Figure 2A:
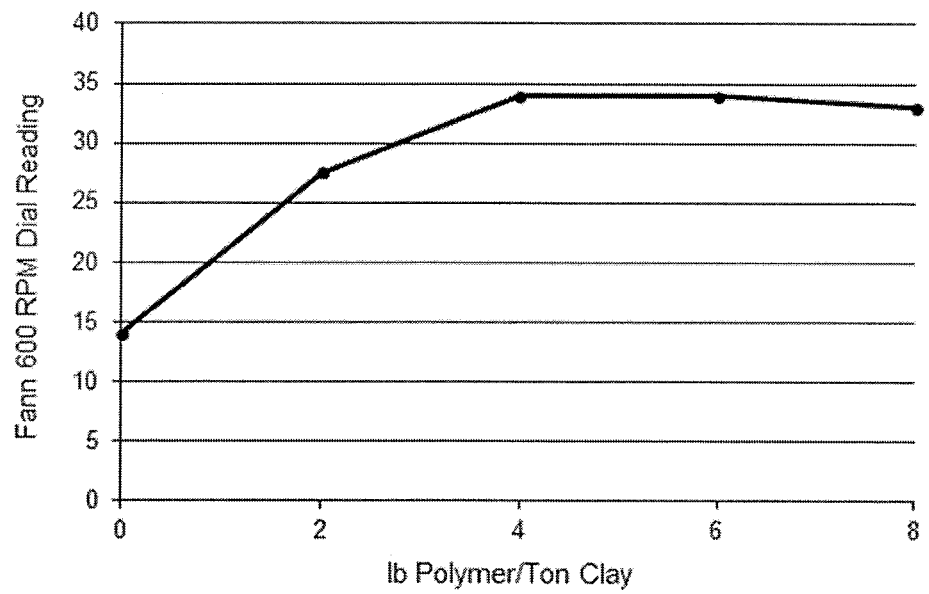
FIG. 2A is a graph representing rheological data for a control sample and four enhanced sepiolite compositions in fresh water in accordance with certain embodiments of the present disclosure.
Figure 2B:
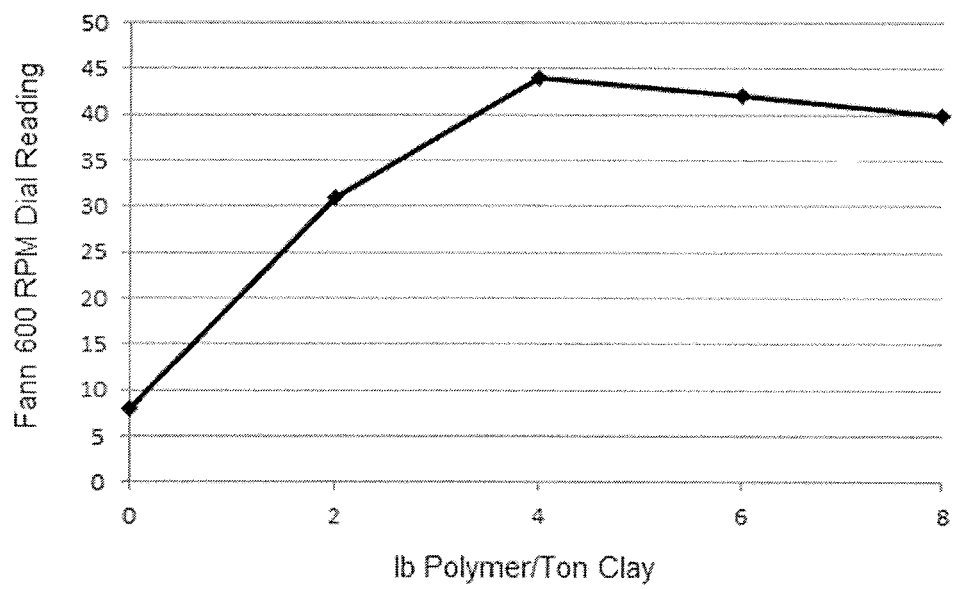
FIG. 2B is a graph representing rheological data for a control sample and four bentonite compositions in fresh water.

As shown in Table 1 and FIG. 2A, the viscosities of treatment fluid samples B, C, D, and E, which each included a fresh water aqueous base fluid, a clay consisting of sepiolite, and an extender consisting of sodium polyacrylate, were greater than the viscosity of treatment fluid sample A, which included only a fresh water aqueous base fluid and a clay consisting of sepiolite. As shown in Table 2 and FIG. 2B, the viscosities of treatment fluid samples G, H, I, and J, which each included a fresh water aqueous base fluid, a clay consisting of bentonite, and an extender consisting of sodium polyacrylate, were greater than the viscosity of treatment fluid sample F, which included only a fresh water aqueous base fluid and a clay consisting of bentonite. Thus, Example 1 demonstrates the ability of the extender including sodium polyacrylate to increase the viscosity, and thereby improve the barrel yield, of a treatment fluid including a fresh water aqueous base fluid and a clay that includes sepiolite.

Example 2

A treatment fluid sample (K) was prepared using only 350 mL deionized water, 20 grams sodium chloride, and 10 grams of a clay consisting of sepiolite. Four additional treatment fluid samples (L-O) were prepared in accordance with certain embodiments of the present disclosure using 350 mL deionized water, 20 grams sodium chloride, 10 grams of a clay consisting of sepiolite, and varying amounts of an extender consisting of sodium polyacrylate having a molecular weight of about 500,000 g/mol. The viscosity of each fluid sample was measured after 10 minutes using a FANN® viscometer. The results are shown in Table 2 and FIG. 3A.

TABLE 3

| Treatment Fluid | K | L | M | N | O |
|---|---|---|---|---|---|
| Deionized Water, mL | 350 | 350 | 350 | 350 | 350 |
| NaCl, g | 20 | 20 | 20 | 20 | 20 |
| Sepiolite, g | 10 | 10 | 10 | 10 | 10 |
| Polymer, lbs/ton | 0 | 2 | 4 | 6 | 8 |
| FANN 600 RPM, 1021 sec$^{-1}$ | 11 | 16 | 22 | 26.5 | 27 |
| Viscosity, cP | 5.5 | 8 | 11 | 13.25 | 13.5 |

A treatment fluid sample (P) was prepared using only 350 mL deionized water, 20 grams sodium chloride, and 10 grams of a clay consisting of bentonite. Four additional treatment fluid samples (Q-T) were prepared using 350 mL deionized water, 20 grams sodium chloride, 10 grams of a clay consisting of bentonite, and varying amounts of an extender consisting of sodium polyacrylate having a molecular weight of about 500,000 g/mol. The viscosity of each fluid sample was measured after 10 minutes using a FANN® viscometer. The results are shown in Table 2 and FIG. 3B.

TABLE 4

| Treatment Fluid | P | Q | R | S | T |
|---|---|---|---|---|---|
| Deionized Water, mL | 350 | 350 | 350 | 350 | 350 |
| NaCl, g | 20 | 20 | 20 | 20 | 20 |
| Bentonite, g | 10 | 10 | 10 | 10 | 10 |
| Polymer, lbs/ton | 0 | 2 | 4 | 6 | 8 |
| FANN 600 RPM, 1021 sec$^{-1}$ | 5 | 5 | 4 | 4 | 3.5 |
| Viscosity, cP | 2.5 | 2.5 | 2 | 2 | 1.75 |

Figure 3A:
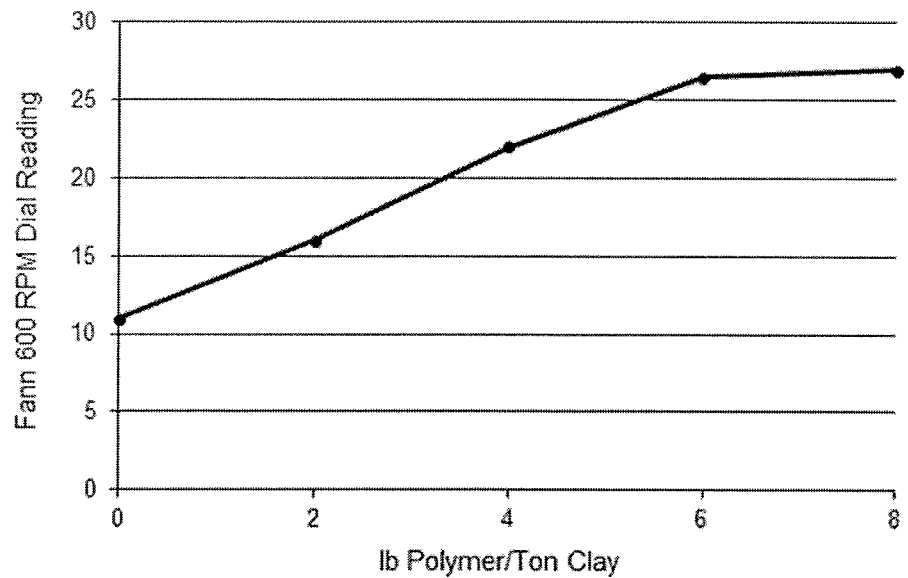
FIG. 3A is a graph representing rheological data for a control sample and four enhanced sepiolite compositions in salt water in accordance with certain embodiments of the present disclosure.
Figure 3B:
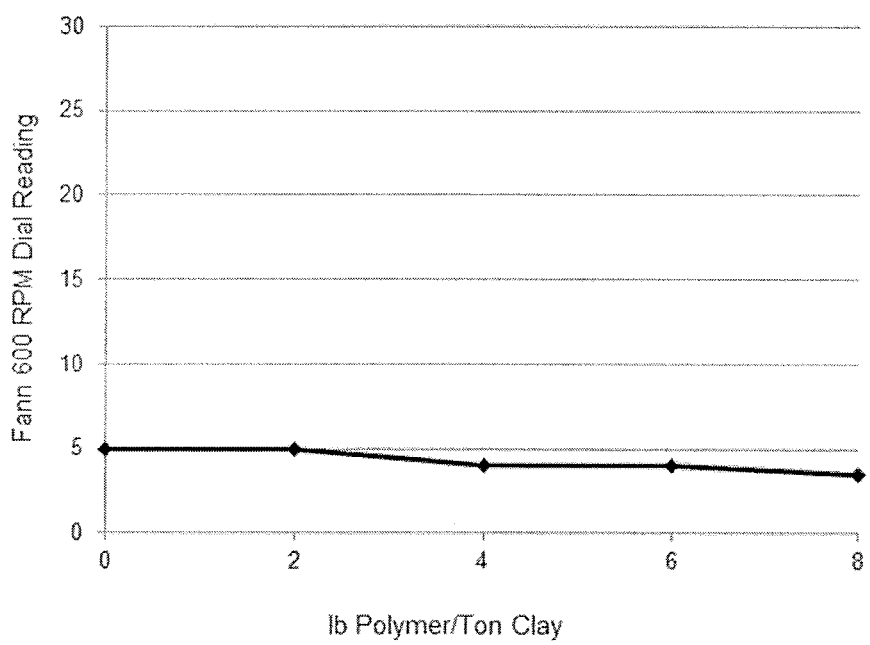
FIG. 3B is a graph representing rheological data for a control sample and four bentonite compositions in salt water.

As shown in Table 3 and FIG. 3A, the viscosities of treatment fluid samples L, M, N and O, which each included a salt water aqueous base fluid, a clay consisting of sepiolite, and an extender consisting of sodium polyacrylate, were greater than the viscosity of treatment fluid sample K, which included only a salt water aqueous base fluid and a clay consisting of sepiolite. As shown in Table 4 and FIG. 3B, the viscosities of treatment fluid samples Q, R, S, and T, which each included a salt water aqueous base fluid, a clay consisting of bentonite, and an extender consisting of sodium polyacrylate, were greater than the viscosity of treatment fluid sample P, which included only a salt water aqueous base fluid and a clay consisting of bentonite. Thus, Example 2 demonstrates the ability of the extender including sodium polyacrylate to increase the viscosity, and thereby improve the barrel yield, of a treatment fluid including a salt water aqueous base fluid and a clay that includes sepiolite. Example 2 also demonstrates that sodium polyacrylate may work better as an extender for sepiolite than bentonite in a salt water aqueous base fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   mixing at least an extender as a dry solid, at least one clay as a dry solid, and an aqueous base fluid to form a treatment fluid, wherein the at least one clay is selected from the group consisting of: sepiolite, palygorskite, attapulgite, and a combination thereof, and wherein the extender consists of sodium polyacrylate with a molecular weight in a range from about 50,000 g/mol to about 700,000 g/mol, wherein the aqueous base fluid comprises an amount of the clay and the extender, combined, from about 2 lbs/bbl of the treatment fluid to about 15 lbs/bbl of the treatment fluid, and wherein the extender is present in an amount from about 1 lbs/ton of the clay to about 8 lbs/ton of the clay, wherein the aqueous base fluid is a salt water base fluid;

wherein a negatively charged portion of the extender interacts with a positively charged portion of the clay to flocculate the clay, and wherein addition of the extender increases a viscosity of the treatment fluid relative to a viscosity of the treatment fluid without the extender; and introducing the treatment fluid into a wellbore penetrating at least a portion of a subterranean formation.

2. The method of claim 1, wherein the extender is present in an amount from about 1 lbs/ton of the clay to about 4 lbs/ton of the clay.

3. The method of claim 1, wherein the aqueous base fluid comprises one or more salts in an amount of about 50 mg/L of the aqueous base fluid to about 500,000 mg/L of the aqueous base fluid.

4. The method of claim 1, wherein the aqueous base fluid comprises an amount of the clay and the extender, combined, from about 2 lbs/bbl of the treatment fluid to about 10 lbs/bbl of the treatment fluid.

5. The method of claim 1 further comprising drilling a portion of the wellbore penetrating the subterranean formation with the treatment fluid.

6. The method of claim 1, wherein the extender and the at least one clay are separately mixed with the aqueous base fluid.

7. A method comprising:
mixing at least an extender as a dry solid, at least one clay as a dry solid, and an aqueous base fluid to form a drilling fluid, wherein the at least one clay is selected from the group consisting of: sepiolite, palygorskite, attapulgite, and a combination thereof, and wherein the extender consists of sodium polyacrylate with a molecular weight in a range from about 300,000 g/mol to about 600,000 g/mol, and wherein the aqueous base fluid comprises an amount of the clay and the extender, combined, from about 2 lbs/bbl of the treatment fluid to about 15 lbs/bbl of the drilling fluid, and wherein the extender is present in an amount from about 1 lbs/ton of the clay to about 8 lbs/ton of the clay, wherein the aqueous base fluid comprises one or more salts in an amount of about 50 mg/L of the aqueous base fluid to about 500,000 mg/L of the aqueous base fluid;

wherein a negatively charged portion of the extender interacts with a positively charged portion of the clay to flocculate the clay, and wherein addition of the extender increases a viscosity of the treatment fluid relative to a viscosity of the treatment fluid without the extender; and drilling at least a portion of the wellbore penetrating a subterranean formation with the drilling fluid.

8. The method of claim 7, wherein the extender is present in an amount from about 1 lbs/ton of the clay to about 4 lbs/ton of the clay.

9. The method of claim 7, wherein the aqueous base fluid comprises an amount of the clay and the extender, combined, from about 2 lbs/bbl of the drilling fluid to about 10 lbs/bbl of the drilling fluid.

10. A method comprising:
blending at least one clay as a dry solid and an extender as a dry solid to create a blended dry composition, wherein the at least one clay consists of sepiolite, and wherein the extender consists of sodium polyacrylate with a molecular weight of about 500,000 g/mol;

mixing at least the blended dry composition with an aqueous base fluid to form a treatment fluid, wherein the aqueous base fluid comprises an amount of the clay and the extender, combined, from about 2 lbs/bbl of the treatment fluid to about 15 lbs/bbl of the treatment fluid, and wherein the extender is present in an amount from about 1 lbs/ton of the clay to about 8 lbs/ton of the clay, wherein the aqueous base fluid comprises one or more salts in an amount of about 50 g/L of the aqueous base fluid to about 60 g/L of the aqueous base fluid;

wherein a negatively charged portion of the extender interacts with a positively charged portion of the clay to flocculate the clay, and wherein addition of the extender increases a viscosity of the treatment fluid relative to a viscosity of the treatment fluid without the extender; and introducing the treatment fluid into a wellbore penetrating at least a portion of a subterranean formation.

11. The method of claim 10, wherein the extender is present in an amount from about 1 lbs/ton of the clay to about 4 lbs/ton of the clay.

12. The method of claim 10, wherein the aqueous base fluid comprises an amount of the clay and the extender, combined, from about 2 lbs/bbl of the treatment fluid to about 10 lbs/bbl of the treatment fluid.

* * * * *